(12) United States Patent
Tsuchida et al.

(10) Patent No.: US 11,991,178 B2
(45) Date of Patent: May 21, 2024

(54) SECRET COMPUTATION SYSTEM, SECRET COMPUTATION SERVER, AUXILIARY SERVER, SECRET COMPUTATION METHOD, AND PROGRAM

(71) Applicant: NEC Corporation, Tokyo (JP)

(72) Inventors: Hikaru Tsuchida, Tokyo (JP); Toshinori Araki, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 17/641,890

(22) PCT Filed: Oct. 4, 2019

(86) PCT No.: PCT/JP2019/039335
§ 371 (c)(1),
(2) Date: Mar. 10, 2022

(87) PCT Pub. No.: WO2021/064996
PCT Pub. Date: Apr. 8, 2021

(65) Prior Publication Data
US 2022/0329596 A1 Oct. 13, 2022

(51) Int. Cl.
*H04L 9/40* (2022.01)
*G06F 7/544* (2006.01)

(52) U.S. Cl.
CPC .............. *H04L 63/10* (2013.01); *G06F 7/544* (2013.01)

(58) Field of Classification Search
CPC ..... H04L 63/10; H04L 63/04; H04L 63/0428; H04L 63/0485; G06F 7/544; G09C 1/00
See application file for complete search history.

(56) References Cited

U.S. PATENT DOCUMENTS 9,813,243 B1 * 11/2017 Triandopoulos ...... H04L 63/061
2009/0055657 A1 2/2009 Asai et al.
(Continued)

FOREIGN PATENT DOCUMENTS

| WO | 2006/101227 A1 | 9/2006 |
| WO | 2015/053185 A1 | 4/2015 |
| WO | 2018/034079 A | 2/2018 |

OTHER PUBLICATIONS

International Search Report for PCT Application No. PCT/JP2019/039335, dated Dec. 17, 2019.
(Continued)

*Primary Examiner* — Javier O Guzman
(74) *Attorney, Agent, or Firm* — Sughrue Mion, PLLC

(57) ABSTRACT

In a secret computation system, each of the three or more secret computation servers is configured to transmit, to the auxiliary server, carry computation information for computing a carry indicating whether or not digit carry occurs when a share of arithmetic operation is added as a binary number. The auxiliary server is configured to compute the carry based on the carry computation information received and compute an adjustment value used for computing the share of the arithmetic operation from a share of logical operation by using the computed carry. The auxiliary server distributes the computed adjustment value to the three or more secret computation servers. Each of the three or more secret computation servers is configured to convert the share of the logical operation to the share of the arithmetic operation by using a distributed value of the adjustment value.

13 Claims, 8 Drawing Sheets

(56) References Cited

U.S. PATENT DOCUMENTS

| | | | |
|---|---|---|---|
| 2016/0218862 A1 | 7/2016 | Ikarashi et al. | |
| 2017/0278433 A1* | 9/2017 | Furukawa | G09C 1/00 |
| 2018/0270057 A1* | 9/2018 | Furukawa | H04L 9/0861 |
| 2019/0212986 A1 | 7/2019 | Araki et al. | |
| 2019/0268149 A1* | 8/2019 | Kariv | H04L 9/0897 |
| 2021/0089676 A1* | 3/2021 | Ford | H04L 9/0825 |
| 2021/0209247 A1* | 7/2021 | Mohassel | A63B 21/023 |
| 2022/0092216 A1* | 3/2022 | Mohassel | G06N 3/084 |
| 2023/0186293 A1* | 6/2023 | Dolev | H04L 9/0869 |
| | | | 705/75 |

OTHER PUBLICATIONS

Toshinori Araki, et al; "High-Throughput Semi-Honest Secure Three-Party Computation with an Honest Majority"; Proceedings of the 2016 ACM SIGSAC Conference on Computer and Communications Security. ACM, 2016. p. 805-817, 2016.

Toshinori Araki, et al.,"Generalizing the SPDZ Compiler for Other Protocols", Proceedings of the 2018 ACM SIGSAC Conference on Computer and Communications Security. ACM, 2018, p. 880-895, 2018.

Toshinori Araki, et al; "Poster: How to Choose Suitable Secure Multiparty Computation Using Generalized SPDZ"; CCS '18, Oct. 15-19, 2018, pp. 1-3.

Kazuma Ohara; "Secure Multi-Party Computation based on Secret Sharing"; Systems, Control and Information vol. 63, No. 2, Feb. 15, 2019, pp. 71-76.

\* cited by examiner

| x | y | x⊕y | (x−y)² |
|---|---|-----|--------|
| 0 | 0 | 0   | 0      |
| 1 | 0 | 1   | 1      |
| 0 | 1 | 1   | 1      |
| 1 | 1 | 0   | 0      |

Fig.3

SECRET COMPUTATION SYSTEM, SECRET COMPUTATION SERVER, AUXILIARY SERVER, SECRET COMPUTATION METHOD, AND PROGRAM

This application is a National Stage Entry of PCT/JP2019/039335 filed on Oct. 4, 2019, the contents of all of which are incorporated herein by reference, in their entirety.

BACKGROUND

Technical Field

The present invention relates to a secret computation system, a secret computation server, an auxiliary server, a secret computation method, and a program.

Background Art

In recent years, research and development of a technique referred to as secret computation has been actively carried out (for example, see PTL 1 and NPL 1). Secret computation is a technique of executing predetermined processing while concealing computation process and its results from a third party. In secret computation, data can be distributed to a plurality of servers (secret computation servers), and any operation can be executed for the data.

In NPL 2 and NPL 3, type conversion processing used in secret computation such as bit decomposition and bit recomposition is described.

CITATION LIST

Patent Literature

[PTL 1] WO 2015/053185

Non Patent Literature

[NPL 1] Toshinori ARAKI, et al, "High-Throughput Semi-Honest Secure Three-Party Computation with an Honest Majority", Proceedings of the 2016 ACM SIGSAC Conference on Computer and Communications Security. ACM, 2016. p. 805-817, 2016

[NPL 2] Toshinori ARAKI, et al, "Generalizing the SPDZ Compiler For Other Protocols.", Proceedings of the 2018 ACM SIGSAC Conference on Computer and Communications Security. ACM, 2018. p. 880-895, 2018

[NPL 3] Toshinori ARAKI, et al, "How to Choose Suitable Secure Multiparty Computation Using Generalized SPDZ", CCS '18, Oct. 15-19, 2018

SUMMARY

Technical Problem

In secret computation, any operation can be executed; however, there is processing unique to secret computation by virtue of its specificity that data is distributed to a plurality of secret computation servers. It can be also said that "bit injection" being one of type conversions disclosed in NPL 3 and the like described above is also processing unique to secret computation. In secret computation, bit injection may be executed as a subroutine in implementation of a specific application. In particular, bit injection may be executed in parallel. When bit injection is executed in parallel, traffic of communication between the secret computation servers may be increased in proportion to parallelism (the number of subroutines related to bit injection executed in parallel).

The present invention has a main example object to provide a secret computation system, a secret computation server, an auxiliary server, a secret computation method, and a program that implement efficient processing when bit injection is executed in parallel.

Solution to Problem

According to a first perspective of the present invention, provided is a secret computation system including: three or more secret computation servers; and an auxiliary server connected to the three or more secret computation servers, wherein each of the three or more secret computation servers is configured to transmit, to the auxiliary server, carry computation information for computing a carry indicating whether or not digit carry occurs when a share of arithmetic operation is added as a binary number, the auxiliary server is configured to compute the carry based on the carry computation information received and compute an adjustment value used for computing the share of the arithmetic operation from a share of logical operation by using the computed carry, and distribute the computed adjustment value to the three or more secret computation servers, and each of the three or more secret computation servers is configured to convert the share of the logical operation to the share of the arithmetic operation by using a distributed value of the adjustment value.

According to a second perspective of the present invention, provided is a secret computation server configured to be connected to an auxiliary server, wherein the secret computation server is configured to transmit, to the auxiliary server, carry computation information for computing a carry indicating whether or not digit carry occurs when a share of arithmetic operation is added as a binary number, acquire, from the auxiliary server, a distributed value of an adjustment value used for computing a share of arithmetic operation from the share of the logical operation by using the carry, and convert the share of the logical operation to the share of the arithmetic operation by using the distributed value of the adjustment value.

According to a third perspective of the present invention, provided is an auxiliary server configured to be connected to three or more secret computation servers, wherein the auxiliary server is configured to receive carry computation information for computing a carry indicating whether or not digit carry occurs when a share of arithmetic operation is added as a binary number, the carry computation information being transmitted by each of the three or more secret computation servers, and compute the carry based on the received carry computation information and compute an adjustment value used for computing a share of arithmetic operation from the share of the logical operation by using the computed carry, and distribute the computed adjustment value to the three or more secret computation servers.

According to a fourth perspective of the present invention, provided is a secret computation method in a secret computation system including three or more secret computation servers and an auxiliary server connected to the three or more secret computation servers, the secret computation method including the steps of: transmitting, by each of the three or more secret computation servers, to the auxiliary server, carry computation information for computing a carry indicating whether or not digit carry occurs when a share of arithmetic operation is added as a binary number; computing, by the auxiliary server, the carry based on the carry computation information received and compute an adjustment value used for computing the share of the arithmetic operation from a share of logical operation by using the computed carry, and distribute the computed adjustment value to the three or more secret computation servers; and converting, by each of the three or more secret computation servers, the share of the logical operation to the share of the arithmetic operation by using a distributed value of the adjustment value.

According to a fifth perspective of the present invention, provided is a program for causing a computer to execute: processing of transmitting, to the auxiliary server, carry computation information for computing a carry indicating whether or not digit carry occurs when a share of arithmetic operation is added as a binary number; processing of acquiring, from the auxiliary server, a distributed value of an adjustment value used for computing a share of arithmetic operation from the share of the logical operation by using the carry; and processing of converting the share of the logical operation to the share of the arithmetic operation by using the distributed value of the adjustment value.

Advantageous Effects of Invention

According to each perspective of the present invention, a secret computation system, a secret computation server, an auxiliary server, a secret computation method, and a program that implement efficient processing when bit injection is executed in parallel are provided. Note that, according to the present invention, instead of or together with the above effects, other effects may be exerted.

BRIEF DESCRIPTION OF THE DRAWINGS

FIG. 3 is a diagram for describing an arithmetical exclusive OR;

DESCRIPTION OF THE EXAMPLE EMBODIMENTS

Figure 1:
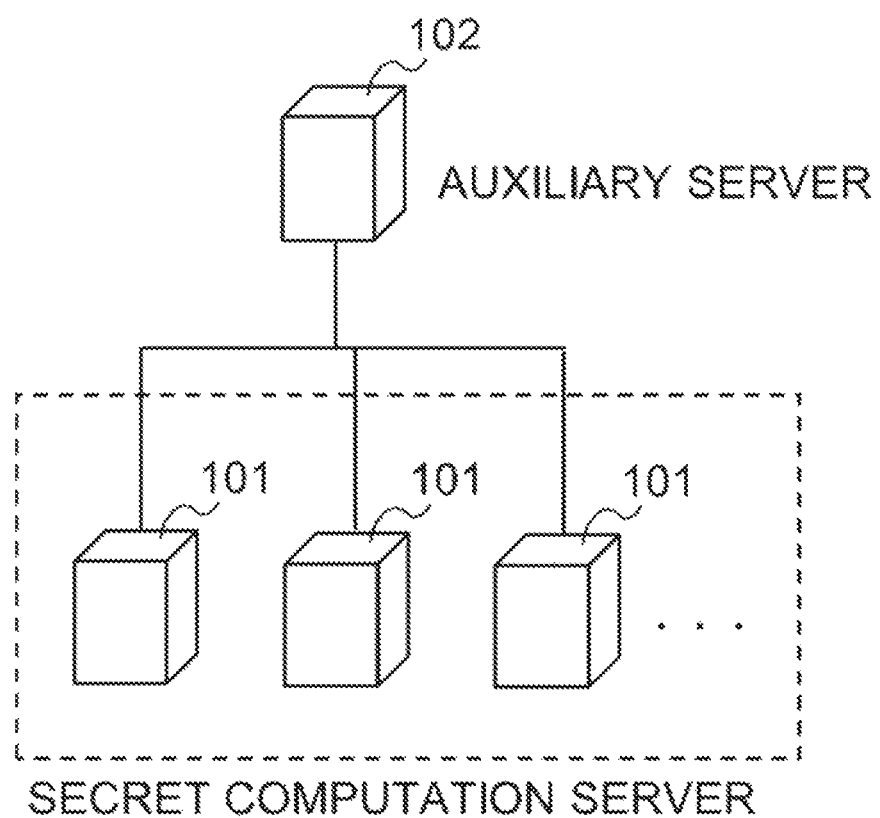
FIG. 1 is a diagram for describing an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

A secret computation system according to an example embodiment includes three or more secret computation servers 101, and an auxiliary server 102 connected to the three or more secret computation servers 101 (see FIG. 1). Each of the three or more secret computation servers 101 transmits, to the auxiliary server 102, carry computation information for computing a carry indicating whether or not carry occurs when a share of arithmetic operation is added as a binary number. The auxiliary server 102 computes the carry based on the received carry computation information, and computes an adjustment value used for computing the share of the arithmetic operation from a share of logical operation by using the computed carry. The auxiliary server 102 distributes the computed adjustment value to the three or more secret computation servers 101. Each of the three or more secret computation servers 101 converts the share of the logical operation to the share of the arithmetic operation by using a distributed value of the adjustment value.

Although the details will be described later, in bit injection in which the share of the logical operation is converted to the share of the arithmetic operation, the arithmetical exclusive OR needs to be computed. A multiplication is required for the arithmetical exclusive OR. In secret computation, in order to compute a multiplication, the secret computation servers 101 need to communicate with each other. The communication occurs for each bit injection, and thus if a plurality of bit injection processes are executed in parallel as in bit recomposition, traffic of communication increases.

In order to solve such inconvenience, in the secret computation system, the auxiliary server 102 that assists operation of the secret computation server 101 is utilized. The auxiliary server 102 computes a carry and thereby detects whether or not digit carry occurs when the share of the arithmetic operation is simply added without executing the arithmetical exclusive OR. When digit carry occurs, the auxiliary server 102 generates an adjustment value for canceling the digit carry, and distributes the adjustment value to the secret computation servers 101. The secret computation server 101 adds the share of the arithmetic operation by using the acquired adjustment value to eliminate the influence of the digit carry, and can thereby efficiently obtain consistent computation results (results of bit injection).

Specific example embodiments will be described below in further detail with reference to the drawings.

First Example Embodiment

A first example embodiment will be described in further detail with reference to the drawings.

[System Configuration]

Figure 2:
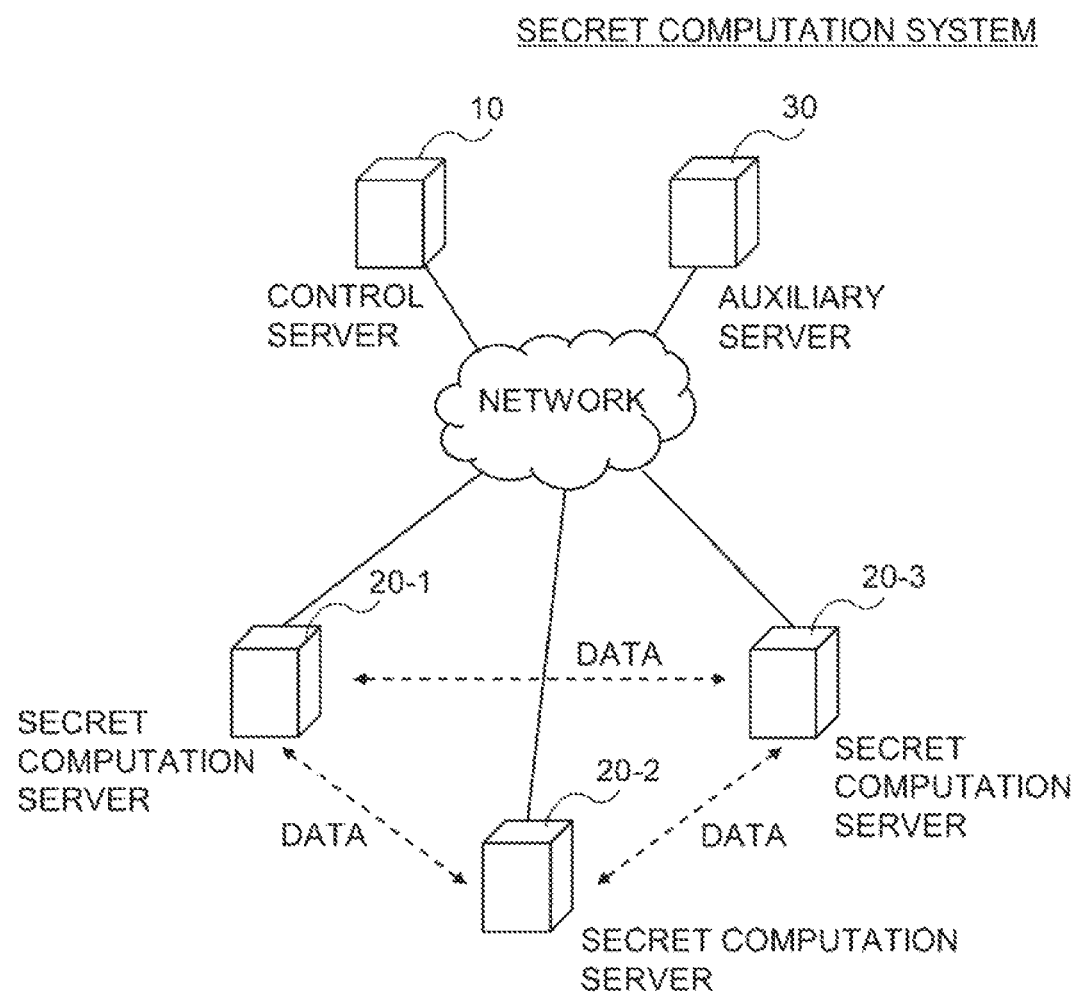
FIG. 2 is a diagram illustrating an example of a schematic configuration of a secret computation system according to a first example embodiment.

FIG. 2 is a diagram illustrating an example of a schematic configuration of the secret computation system according to the first example embodiment. With reference to FIG. 2, the secret computation system includes a control server 10, secret computation servers 20-1 to 20-3, and an auxiliary server 30. Note that, in the following description, the secret computation servers 20-1 to 20-3 are simply referred to as "secret computation server 20" when there is no special reason to distinguish the secret computation servers 20-1 to 20-3.

The control server 10, the secret computation server 20, and the auxiliary server 30 are connected in a wired or wireless manner so as to be capable of communicating with each other.

The control server 10 is an apparatus that controls secret computation in the secret computation server 20. Specifically, the control server 10 controls input and output of data to and from the secret computation server 20.

The secret computation server 20 is an apparatus that executes secret computation. The secret computation server 20 executes predetermined processing for data (data to be secretly distributed) acquired from the control server 10. Examples of the predetermined processing include performing operation of acquired pieces of data, and searching database with the acquired data being used as a search key. The secret computation server 20 executes the predetermined processing in cooperation with other secret computation servers 20. In this case, the secret computation server 20 performs transmission and reception of data to and from other secret computation servers 20.

The secret computation server 20 executes (2, 3) secret computation using duplicate secret distribution having an access structure of a threshold (hereinafter referred to as (2, 3) secret distribution). In (2, 3) secret distribution, three pieces of distribution information (share) are generated from input data (secret information). In (2, 3) secret distribution, the original value (secret information) is restored by collecting at least as many pieces of the distribution information as the number of the threshold (=2). In other words, the original value can be restored from two or more pieces of distribution information; however, the original value cannot be obtained from one or less pieces of distribution information.

The secret computation server 20 transmits (responses) computation results to the control server 10. The secret computation server 20 may transmit the computation results to an apparatus different from the control server 10.

The auxiliary server 30 is an apparatus that stores secret computation performed by the secret computation server 20. Although the details will be described later, the auxiliary server 30 operates so that the secret computation server 20 can efficiently execute bit injection. Note that it is assumed that the auxiliary server 30 is a "semi-honest attacker". The semi-honest attacker is an attacker that attempts to acquire as much information as possible within the range of conforming to a protocol determined in secret computation.

Note that the configuration illustrated in FIG. 2 is an example, and is not to limit the configuration of the secret computation system. It is only necessary that three or more secret computation servers 20 be included in the secret computation system. Although the control server 10 is illustrated in FIG. 2, when a value used for secret computation is distributed in the secret computation server 20 in advance, for example, the control server 10 may be unnecessary.

[Notation]

The notation is defined.

A residue class ring modulo 2 is expressed as below.

$$\mathbb{Z}_2$$

A residue class ring modulo $2^k$ is expressed as below (k is a natural number; hereinafter the same applies).

$$\mathbb{Z}_{2^k}$$

A share belonging to the residue class ring modulo 2 is expressed as [x]. A share belonging to the residue class ring modulo $2^k$ is expressed as [x]k. The share belonging to the residue class ring modulo 2 is also expressed as a "share of bits" or a "share of logical operation". The share belonging to the residue class ring modulo $2^k$ is also expressed as a "share of a ring" or a "share of arithmetic operation".

Next, type conversion of secret computation related to the disclosure of the present application will be described. The type conversion of secret computation includes "bit decomposition", "bit injection", and "bit recomposition".

[Bit Decomposition]

Bit decomposition is processing of converting distribution information for arithmetic operation to distribution information for logical operation. In bit decomposition, a secretly distributed value is converted from a share of a decimal number to a share of a binary number.

For example, a case in which an integer "5" is distributed in the secret computation servers 20 is considered. In this case, if modulo is 8 ($2^3$), the integer 5 is distributed so as to satisfy $x=x_1+x_2+x_3 \mod 2^3$. For example, the integer 5 is distributed as $x_1=1$, $x_2=2$, and $x_3=2$. Note that the format that the share of the arithmetic operation is to satisfy is as expressed in the following expression (1). Note that "mod" represents modulo operation.

[Math. 1]

$$x=x_1+x_2+x_3 \mod 2^k \quad (1)$$

In a case of distribution as described above, each party (secret computation server 20) stores the following information.

Secret computation server 20-1: $(x_1, x_2)=(1, 2)$
Secret computation server 20-2: $(x_2, x_3)=(2, 2)$
Secret computation server 20-3: $(x_3, x_1)=(2, 1)$ Next, an element (sub-share) of the share stored in each secret computation server 20 is converted to a binary number, and each digit of the bits converted to the binary number is taken out. Specifically, the j-th bit is taken out of $(x_i, x_{i+1})$. Note that, in the disclosure of the present application, i is a suffix (i=1, 2, 3) for identifying the secret computation server 20. If i=3, i+1=4=1. j is an integer of 0 or greater and k−1 or less that indicates the digit of the binary number. In the disclosure of the present application, "b" indicated before a numerical value indicates that the numerical value is expressed in a binary number.

In the example described above, binary number expression of $x_1=1$ is b001, and 1 being the 0-th bit (least significant bit), 0 being the 1st bit, and 0 being the 2nd bit are taken out. Similarly, binary number expression of $x_2=x_3=2$ is b010, and 0 being the 0-th bit, 1 being the 1st bit, and 0 being the 2nd bit are taken out. Note that the operation of taking out the share of the j-th bit does not require communication between the secret computation servers 20.

The share of the j-th bit taken out by each secret computation server 20 can be expressed as follows.

Secret computation server 20-1: $(x_{1|j}, x_{2|j})$
Secret computation server 20-2: $(x_{2|j}, x_{3|j})$
Secret computation server 20-3: $(x_{3|j}, x_{1|j})$ If j=0, Secret computation server 20-1: $(x_{1|0}, x_{2|0})=(1, 0)$
Secret computation server 20-2: $(x_{2|0}, x_{3|0})=(0, 0)$
Secret computation server 20-3: $(x_{3|0}, x_{1|0})=(0, 1)$ If j=1, Secret computation server 20-1: $(x_{1|1}, x_{2|1})=(0, 1)$
Secret computation server 20-2: $(x_{2|1}, x_{3|1})=(1, 1)$
Secret computation server 20-3: $(x_{3|1}, x_{1|1})=(1, 0)$ If j=2, Secret computation server 20-1: $(x_{1|2}, x_{2|2})=(0, 0)$
Secret computation server 20-2: $(x_{2|2}, x_{3|2})=(0, 0)$ Secret computation server 20-3: $(x_{3|2}, x_{1|2})=(0, 0)$ Next, each secret computation server 20 converts the share $(x_{j|j}, x_{i+1|j})$ of the j-th bit to distribution information (share) for logical operation by means of local re-sharing. Specifically, each secret computation server 20 converts the share $(x_{j|j}, x_{i+1|j})$ of the j-th bit so as to satisfy the format of the share of the logical operation. Note that the format that the share of the logical operation is to satisfy is as expressed in the following expression (2).

[Math. 2]

$$x = x_1 \oplus x_2 \oplus x_3 \bmod 2 \quad (2)$$

Note that, in expression (2), the following is an operator representing exclusive OR.

$\oplus$

When the share of the j-th bit is converted to the format of the share of the logical operation, each secret computation server 20 stores the following share.

The secret computation server 20-1 stores the following share.

$(x_{1|j}, 0)$ $(0, x_{2|j})$ $(0, 0)$

The secret computation server 20-2 stores the following share.

$(0, 0)$ $(x_{2|j}, 0)$ $(0, x_{3|j})$

The secret computation server 20-3 stores the following share.

$(0, x_{1|j})$ $(0, 0)$ $(x_{3|j}, 0)$

The share of the logical operation (share of bits) of each element $(x_1, x_2, x_3)$ constituting the share of the arithmetic operation (see expression (1)) is as follows:

$[x_{1|j}] = (x_{1,j}, 0)(0,0)(0, x_{1|j})$ $[x_{2|j}] = (0, x_{2|j})(x_{2|j}, 0)(0, 0)$ $[x_{3|j}] = (0, 0)(0, x_{3|j})(x_{3|j}, 0)$

Note that, in the share of the logical operation, the left parentheses represent the share stored by the secret computation server 20-1, the center parentheses represent the share stored by the secret computation server 20-2, and the right parentheses represent the share stored by the secret computation server 20-3.

Expression of the example described above (example of performing bit decomposition on the numerical value 5) as the share of the logical operation is as follows.

0-th bit (j=0)

$[x_{1|0}] = (1,0)(0,0)(0,1)$ $[x_{2|0}] = (0,0)(0,0)(0,0)$ $[x_{3|0}] = (0,0)(0,0)(0,0)$

1st bit (j=1)

$[x_{1|1}] = (0,0)(0,0)(0,0)$ $[x_{2|1}] = (0,1)(1,0)(0,0)$ $[x_{3|1}] = (0,0)(0,1)(1,0)$

2nd bit (j=2)

$[x_{1|2}] = (0,0)(0,0)(0,0)$ $[x_{2|2}] = (0,0)(0,0)(0,0)$ $[x_{3|2}] = (0,0)(0,0)(0,0)$

The secret computation server 20 computes the share $([x|_j], j=0, \ldots k-1)$ of the logical operation by using the share of the logical operation of each element described above. Specifically, the secret computation server 20 adds the share of the logical operation of each element using an adder, and thereby computes the share of the logical operation based on the following expression (3). With the computation of expression (3), the processing of bit decomposition ends.

[Math. 3]

$$[x_{|j}] = [x_{1|j}] + [x_{2|j}] + [x_{3|j}] \quad (3)$$

[Bit Injection]

Bit injection is processing of converting distribution information related to a bit (0, 1) for logical operation to distribution information related to a numerical value (0, 1) for arithmetic operation. In bit injection, a share of a binary number is converted to a share of a decimal number.

Each secret computation server 20 stores the share of the logical operation (share of bits). Specifically, the secret computation server 20-1 stores $(x_1, x_2)$. The secret computation server 20-2 stores $(x_2, x_3)$. The secret computation server 20-3 stores $(x_3, x_1)$. Note that the elements $(x_1, x_2, x_3)$ constituting the share $[x]$ of the logical operation satisfy expression (2) being the format of the share of the logical operation.

Next, the secret computation server 20 locally re-shares each element $(x_1, x_2, x_3)$ described above. As a result, each secret computation server 20 stores the following share.

The secret computation server 20-1 stores the following share.

$(x_1, 0)$ $(0, x_2)$ $(0, 0)$

The secret computation server 20-2 stores the following share.

$(0, 0)$ $(x_2, 0)$ $(0, x_3)$

The secret computation server 20-3 stores the following share.

$(0, x_1)$ $(0, 0)$ $(x_3, 0)$

The share of the arithmetic operation of each element ($x_1$, $x_2$, $x_3$) is as follows:

$$[x_1]^k=(x_1,0)(0,0)(0,x_1)$$

$$[x_2]^k=(0,x_2)(x_2,0)(0,0)$$

$$[x_3]^k=(0,0)(0,x_3)(x_3,0)$$

When the share of the arithmetic operation of each element is obtained, the secret computation server 20 computes the share $[x]^k$ of the arithmetic operation by using arithmetical exclusive OR (expressed as ArithXOR) using the share (see following expression (4)).

[Math. 4]

$$[x]=\text{ArithXOR}([x_1],\text{ArithXOR}([x_2],[x_3])) \quad (4)$$

Here, usually, the exclusive OR is processing performed for the bit (0, 1), and execution for the numerical value (0, 1) cannot be permitted. Thus, the arithmetical exclusive OR is performed by the following expression (5).

[Math. 5]

$$(x-y)^2 = x \oplus y \quad (5)$$

In expression (5), the right-hand side represents a regular exclusive OR, and the left-hand side represents an arithmetical exclusive OR.

Figure 3:
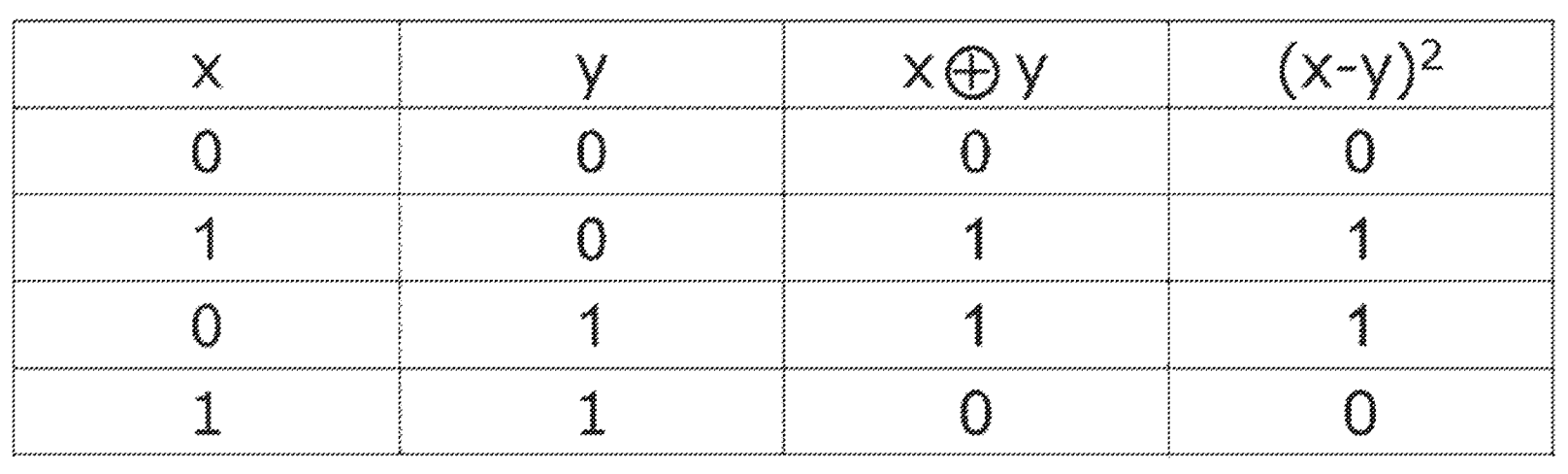

Possible values of the shares $[x]^k$, $[y]^k$ of the arithmetic operation are 0 or 1, and the arithmetical exclusive OR related to these shares can be computed by expression (5). The relationship between the possible values of the shares $[x]^k$, $[y]^k$ of the arithmetic operation and their arithmetical exclusive OR are summarized as in FIG. 3.

As described above, in bit injection, the share ($[x_1]^k$, $[x_2]^k$, $[x_3]^k$) of the arithmetic operation of each element is obtained by local re-sharing of each element ($x_1$, $x_2$, $x_3$). Subsequently, the arithmetical exclusive OR is computed by the above expression (5). If the arithmetical exclusive OR is not computed, the bit (0, 1) cannot be converted to the share of the numerical value (0, 1). Specifically, if $[x]^k=[x_1]^k+[x_2]^k+[x_3]^k$ is computed instead of the arithmetical exclusive OR, correct conversion cannot be performed.

For example, if $x_1=1$, $x_2=1$, and $x_3=1$, $[x]^k=3$, which is not correct results. Bit injection is processing of converting the bit (0, 1) to the numerical value (0, 1), and results need to be "0" or "1". In the example described above, $[x]^k$ needs to be 1 ($[x]^k=1$). In order to solve such inconvenience, in computation of bit injection, computation of the arithmetical exclusive OR is required.

[Bit Recomposition]

Bit recomposition is processing of converting distribution information for logical operation to distribution information for arithmetic operation. In bit recomposition, a secretly distributed value is converted from a share of a binary number to a share of a decimal number. In bit recomposition, a share string of the logical operation of (0, 1) is input, and the share of the arithmetic operation is output.

For example, a case in which the share (share of logical operation, share of bits) of b0101 is distributed to each secret computation server 20 is considered. In this case, when bit recomposition is executed, the share (share of arithmetic operation, share of a ring) of a numerical value 5 is distributed to each secret computation server 20.

In the secret computation system according to the first example embodiment, the need of computation of the arithmetical exclusive OR required at the time of bit injection is eliminated, and communication costs (traffic of communication, number of times of communication) at the time of bit injection computation, in particular, communication costs when bit injection is executed in parallel, are reduced. In the secret computation system according to the first example embodiment, the auxiliary server 30 is utilized for reduction of the communication costs.

Next, details of each apparatus constituting the secret computation system will be described.

Figure 4:
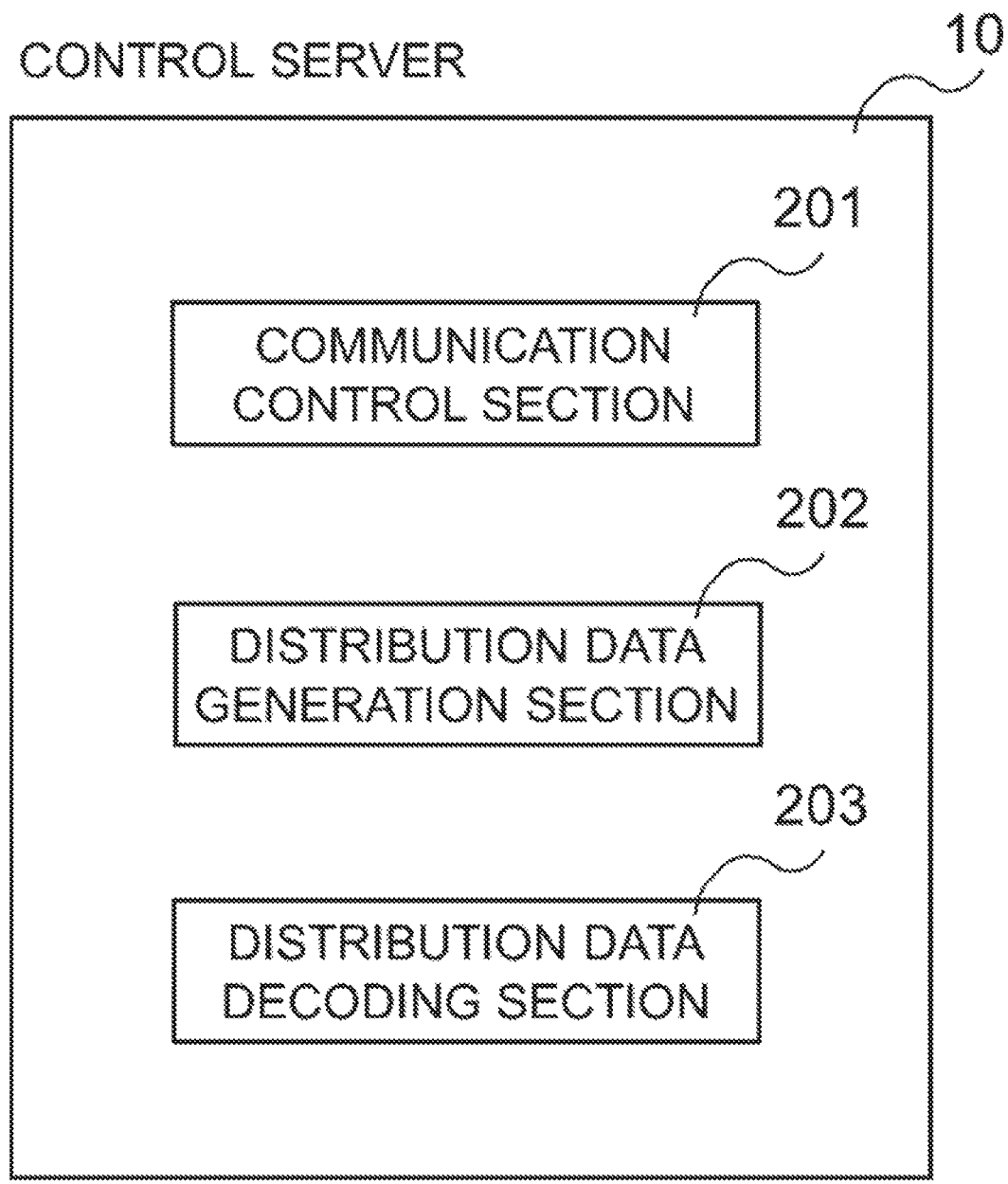
FIG. 4 is a diagram illustrating an example of a processing configuration of a control server according to the first example embodiment.

FIG. 4 is a diagram illustrating an example of a processing configuration (processing module) of the control server 10 according to the first example embodiment. With reference to FIG. 4, the control server 10 includes a communication control section 201, a distribution data generation section 202, and a distribution data decoding section 203.

The communication control section 201 is a means for controlling communication with another apparatus (secret computation server 20).

The distribution data generation section 202 is a means for generating the share to be delivered to the secret computation server 20. The generated share is delivered to each secret computation server 20 via the communication control section 201.

The distribution data decoding section 203 is a means for collecting and restoring results of secret computation performed by the secret computation server 20.

Figure 5:
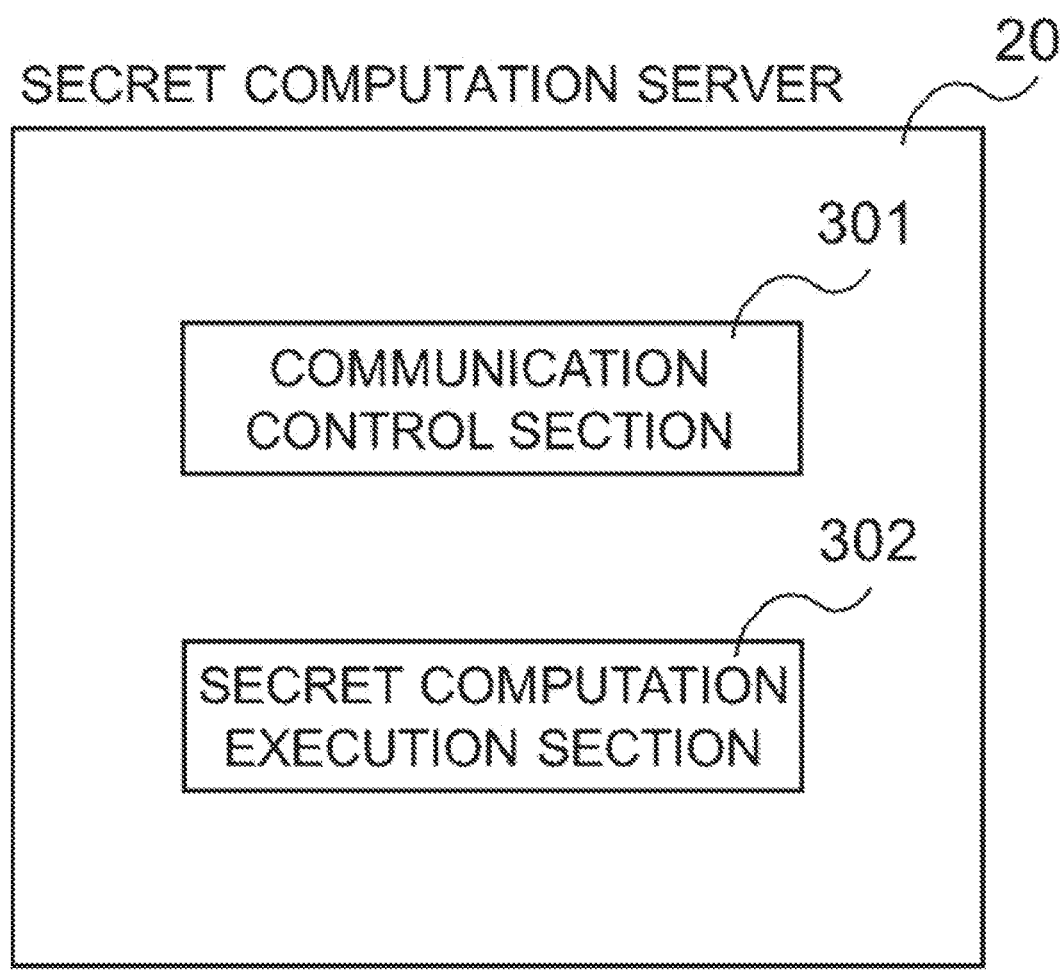
FIG. 5 is a diagram illustrating an example of a processing configuration of a secret computation server according to the first example embodiment.

FIG. 5 is a diagram illustrating an example of a processing configuration (processing module) of the secret computation server 20 according to the first example embodiment. With reference to FIG. 5, the secret computation server 20 includes a communication control section 301 and a secret computation execution section 302.

The communication control section 301 is a means for controlling communication with another apparatus (the control server 10, another secret computation server 20, the auxiliary server 30).

The secret computation execution section 302 is a means for executing predetermined secret computation. The secret computation execution section 302 uses various subroutines at the time of executing predetermined processing. For example, the secret computation execution section 302 uses subroutines such as bit decomposition, bit injection, bit recomposition, and pop count. Note that pop count is processing of counting the number of is when a numerical value is expressed in a binary number.

Detailed operation used by the secret computation execution section 302 for computing the subroutine will be described together with operation of the auxiliary server 30.

Figure 6:
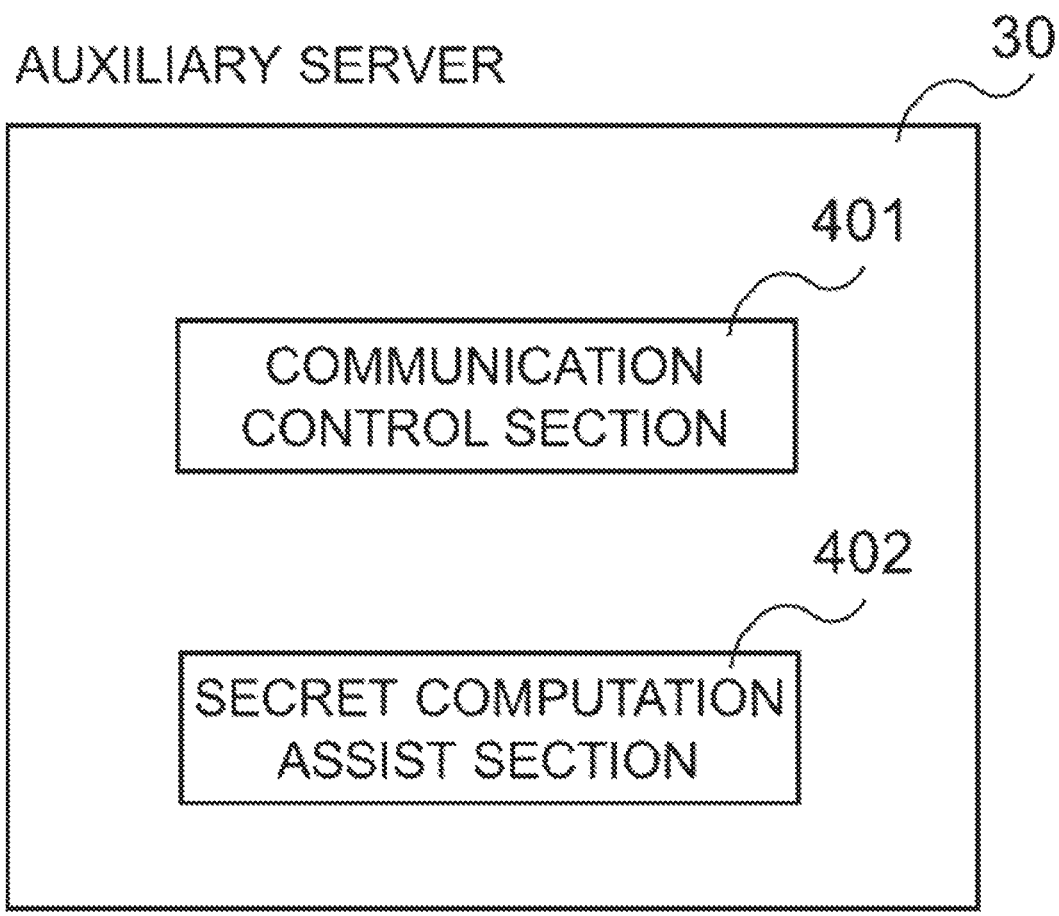
FIG. 6 is a diagram illustrating an example of a processing configuration of an auxiliary server according to the first example embodiment.

FIG. 6 is a diagram illustrating an example of a processing configuration (processing module) of the auxiliary server 30 according to the first example embodiment. With reference to FIG. 6, the auxiliary server 30 includes a communication control section 401 and a secret computation assist section 402.

The communication control section 301 is a means for controlling communication with another apparatus (secret computation server 20).

The secret computation assist section 402 is a means for assisting secret computation performed by each secret computation server 20. More specifically, the secret computation assist section 402 acquires information (hereinafter expressed as carry computation information) for computing a "carry" from each secret computation server 20. The secret computation assist section 402 computes the "carry" by using the carry computation information acquired from each secret computation server 20, and computes an "adjustment value" based on the computed carry. The secret computation assist section 402 delivers (distributes) the computed adjustment value to respective secret computation servers 20.

The carry is information for determining whether or not digit carry occurs when the arithmetical share of each element is added as a bit (binary number). For example, in addition of the numerical value "1" and the numerical value "1", digit carry occurs. In contrast, in addition of the numerical value "0" and the numerical value "1", digit carry does not occur. The carry is information for determining presence or absence of the digit carry.

The adjustment value is data delivered to each secret computation server 20 so that each secret computation server 20 obtains a correct arithmetical share without computing the arithmetical exclusive OR. The adjustment value is used for computing the share of the arithmetic operation from the share of the logical operation.

In the following, operation performed when the secret computation server 20 and the auxiliary server 30 execute a subroutine related to bit injection, bit recomposition, and pop count will be described.

[Bit Injection]

Figure 7:
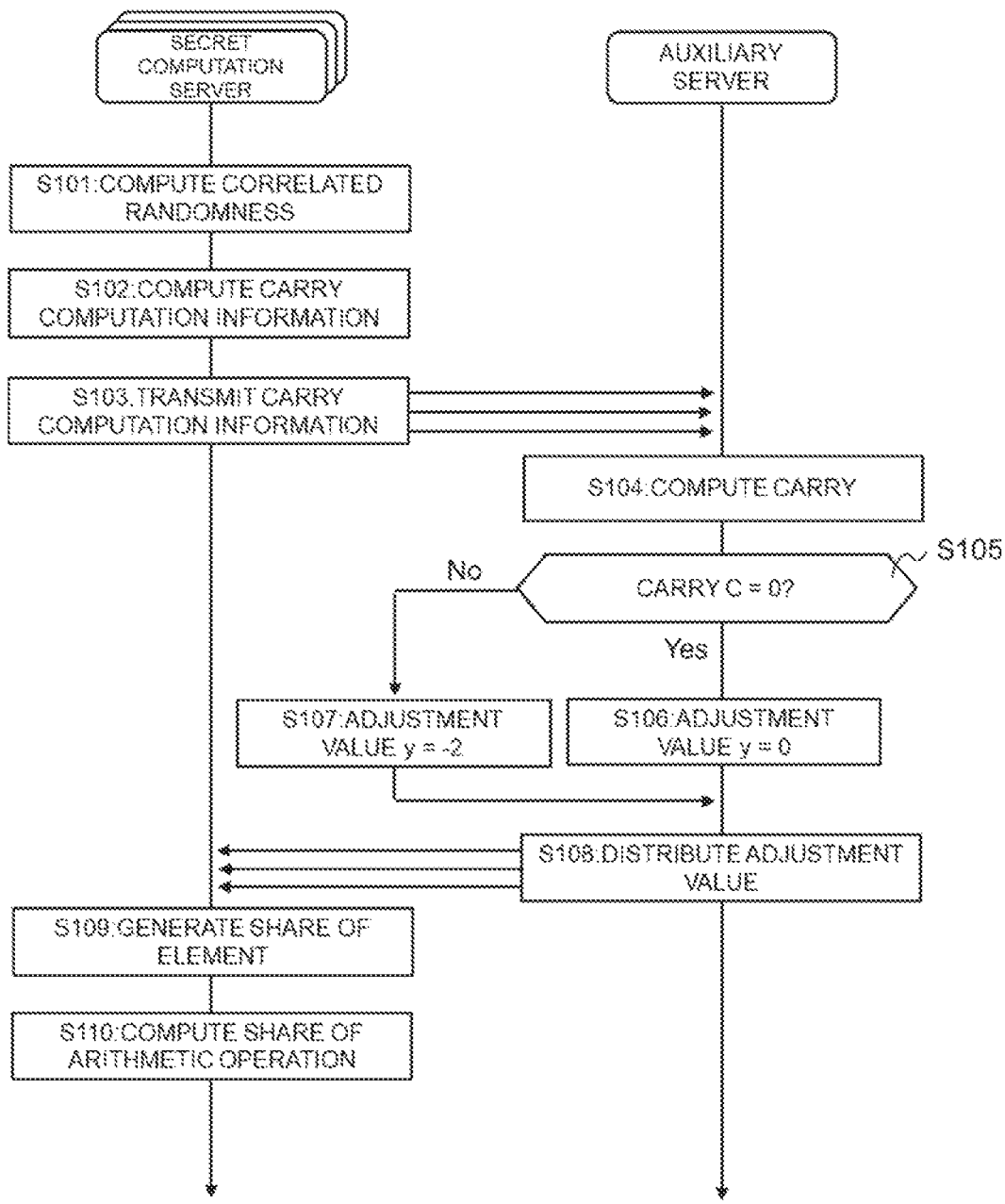
FIG. 7 is a sequence diagram illustrating an example of operation of the secret computation system according to the first example embodiment.

FIG. 7 is a sequence diagram illustrating an example of operation performed when bit injection is executed in the secret computation system according to the first example embodiment.

Note that, prior to secret computation, the secret computation execution section 302 of each secret computation server 20 generates seeds Seed_i and Seed_i+1, and shares the seeds with other secret computation servers 20. Each secret computation execution section 302 shares the two seeds with other secret computation servers 20 using a protocol such as key sharing. Note that the seeds may be shared with another method, not limited to key sharing.

Each secret computation execution section 302 stores a seed Seed' in common. The seed Seed' may be input from the control server 10, or one of a plurality of secret computation servers 20 may generate the seed and deliver the seed to other secret computation servers 20.

In bit injection, the following share of the logical operation is input.

$$[x](x \in \{0,1\}, x = x_1 \oplus x_2 \oplus x_3)$$

The share is input to the subroutine of bit injection. In bit injection, the share $[x]k$ of the arithmetic operation is output.

The secret computation execution section 302 of each secret computation server 20 computes correlated randomness $\beta_i$ (Step S101). The correlated randomness $\beta_i$ satisfies the following expression (6).

[Math. 6]

$$\beta_i \in \mathbb{Z}_2 \beta_1 \oplus \beta_2 \oplus \beta_3 = 0 \tag{6}$$

Note that the correlated randomness $\beta_i$ can be computed with the method described in NPL 1, and thus detailed description thereof will be omitted. The seeds Seed_i, Seed_i+1, and Seed' are used for computation of the correlated randomness $\beta_i$.

Each secret computation execution section 302 computes the "carry computation information". Specifically, the secret computation execution section 302 computes carry computation information $c_i$ according to the following expression (7) (Step S102). Note that "·" indicated in expression (7) and the like represents multiplication operation.

[Math. 7]

$$c_i = \beta_i \oplus x_i \cdot x_{i+1} \tag{7}$$

Note that expression (7) indicates that the secret computation server 20 conceals the share $(x_i, x_{i+1})$ of the logical operation stored by the secret computation server 20 itself by using the correlated randomness $\beta_i$, and generates the carry computation information $c_i$. In other words, it is assumed that the auxiliary server 30 is a semi-honest attacker, and the secret computation server 20 generates the carry computation information $c_i$ so that the contents of the share are not known to the auxiliary server 30.

Each secret computation execution section 302 transmits the computed carry computation information c to the auxiliary server 30 (Step S103).

The secret computation assist section 402 of the auxiliary server 30 computes a carry C. The carry C is defined by the following expression (8).

[Math. 8]

$$C = x_1 \cdot x_2 \oplus x_2 \cdot x_3 \oplus x_3 \cdot x_1 \tag{8}$$

The secret computation assist section 402 of the auxiliary server 30 computes the carry C by using the carry computation information $c_i$ acquired from the secret computation server 20 (Step S104). Specifically, the secret computation assist section 402 computes the carry C according to the following expression (9).

[Math. 9]

$$C = c_1 \oplus c_2 \oplus c_3 \tag{9}$$

Note that the carry computation information that the auxiliary server 30 acquires from each secret computation server 20 is concealed by the correlated randomness $\beta_i$ (see expression (7)). Thus, the auxiliary server 30 cannot know the elements $(x_1, x_2, x_3)$ of the share from the acquired carry computation information. Here, the correlated randomness $\beta_i$ includes property (exclusive OR is 0) indicated in expression (6). With the property, computation results of expression (9) and computation results of expression (8) match. In other words, the auxiliary server 30 cannot know the contents of the share, but can correctly perform computation of the carry C.

The secret computation assist section 402 determines whether the value of the carry C is "0" or "1" (Step S105).

When the carry C is "0" (Step S105, Yes), the secret computation assist section 402 sets an adjustment value y to "0" (Step S106).

When the carry C is "1" (Step S105, No), the secret computation assist section 402 sets the adjustment value y to "−2" (Step S107).

The relationship between the carry C and the adjustment value y is summarized as in the following expression (10).

[Math. 10]

$$y = \begin{bmatrix} 0 (C = 0) \\ -2 \bmod 2^k (C = 1) \end{bmatrix} \tag{10}$$

The secret computation assist section 402 distributes (delivers) the share $[y]^k$ of the generated adjustment value y to each secret computation server 20 (Step S108).

The secret computation execution section 302 of each secret computation server 20 generates the shares $[x_1]^k$, $[x_2]^k$, $[x_3]^k$ of the arithmetic operation of each element from the share of bits (share of logical operation) [x] by means of local re-sharing (Step S109).

The secret computation execution section 302 computes the share $[x]k$ of the arithmetic operation by using the share of the arithmetic of each element described above and the share of the adjustment value y (Step S110). Specifically, the secret computation execution section 302 computes the share of the arithmetic operation, based on the following expression (11).

[Math. 11]

$$[x]^k=[x_1]^k+[x_2]^k+[x_3]^k+[y]^k \qquad (11)$$

With the computation of the above expression (11), the processing (subroutine) related to bit injection ends. In this manner, each of the plurality of secret computation servers 20 converts the share of the logical operation to the share of the arithmetic operation by using the distributed value of the adjustment value y. More specifically, the secret computation server 20 executes bit injection related to a predetermined value x by using the distributed value of the adjustment value y.

For example, a case in which the bit "1" is converted to the numerical value "1" (execution of bit injection) is considered. In this case, the element (sub-share) of the share of the logical operation of the bit "1" is $x_1=1$, $x_2=1$, and $x_3=1$. According to expression (8), the carry C is "1". Thus, according to expression (10), the adjustment value y is "−2". When the share of the arithmetic operation is computed according to expression (11), $[x]^k=1+1+1-2=1$ is obtained. Thus, the share of the bit "1" is correctly converted to the share of the numerical value "1".

Alternatively, a case in which the bit "0" is converted to the numerical value "0" is considered. In this case, each element of the share of the logical operation of the bit "0" is $x_1=0$, $x_2=0$, and $x_3=0$. According to expression (8), the carry C is "0". Thus, according to expression (10), the adjustment value y is "0". When the share of the arithmetic operation is computed according to expression (11), $[x]^k=0+0+0+0=0$ is obtained. Thus, the share of the bit "0" is correctly converted to the share of the numerical value "0".

[Bit Recomposition]

Next, a case in which the secret computation server 20 and the auxiliary server 30 execute bit recomposition will be described. The secret computation server 20 and the auxiliary server 30 execute (implement) bit recomposition by executing a plurality of bit injections in parallel using the carry computation information, the carry, and the adjustment value.

Basic operation (flow, order of processing) of the secret computation system at the time of executing bit recomposition is the same as that at the time of executing bit injection, and thus description corresponding to FIG. 7 is omitted. In the following, differences between bit injection and bit recomposition will mainly be described.

In bit recomposition, the following share string of the logical operation is input.

$$([x_j])_{j=0}^{k-1}(x_j \in \{1,0\}, x_j=x_{j,1}\oplus x_{j,2}\oplus x_{j,3})$$

The share string of the subroutine of bit recomposition is input. In bit recomposition, the following share of the arithmetic operation is output.

$$[x]^k(x=\Sigma_{j=0}^{k-1} 2^j \cdot x_j)$$

The secret computation server 20 computes correlated randomness $\beta_{j,i}$ for each bit of k-digit bits (j=0, 1, ... k−1) (see expression (12)).

[Math. 12]

$$\beta_{j,i} \in \mathbb{Z}_2 \beta_{j,1}\oplus\beta_{j,2}\oplus\beta_{j,3}=0 \qquad (12)$$

The secret computation server 20 computes the carry computation information for each bit of k-digit bits (see expression (13)).

[Math. 13]

$$c_{j,i}=\beta_{j,i}\oplus x_{j,i} \cdot x_{j,i+1} \qquad (13)$$

The auxiliary server 30 computes the carry C for each bit of k-digit bits by using the carry computation information acquired from each secret computation server 20 (see expression (14)).

[Math. 14]

$$C_j=c_{j,1}\oplus c_{j,2}\oplus c_{j,3} \qquad (14)$$

The auxiliary server 30 determines the value of the carry C for each bit of k-digit bits, and the adjustment value y is computed based on the determined value (see expression (15)).

[Math. 15]

$$y_j = \begin{bmatrix} 0(C_j = 0) \\ -2\bmod 2^k(C_j = 1) \end{bmatrix} \qquad (15)$$

The auxiliary server 30 computes the value expressed in the following expression (16) from the adjustment value $y_j$ (the sum of the values obtained by multiplying adjustment value $y_j$ of each digit by 2 to the power of j).

[Math. 16]

$$[\Sigma_{j=0}^{k-1} 2^j \cdot y_j]^k = \Sigma_{j=0}^{k-1} 2^j \cdot [y_j]^k \qquad (16)$$

The auxiliary server 30 distributes the value computed by the above expression (16) to respective secret computation servers 20.

The secret computation server 20 generates the shares $[x_{j,1}]^k$, $[x_{j,2}]^k$, $[x_{j,3}]^k$ of the arithmetic operation of each element from the share of the bit (share of logical operation) $[x_j]$ by means of local re-sharing for each bit of k-digit bits.

The secret computation server 20 computes the share $[x]^k$ of the arithmetic operation by the following expression (17).

[Math. 17]

$$[x]^k=\Sigma_{j=0}^{k-1} 2^j \cdot ([x_{j,1}]^k+[x_{j,2}]^k+[x_{j,3}]^k+[y_j]^k) \qquad (17)$$

Note that expression (17) can be deformed into the following expression (18). In expression (18), the secret computation server 20 uses the value (distributed share) acquired from the auxiliary server 30 as the sum of the values obtained by multiplying adjustment value y by 2 to the power of j.

[Math. 18]

$$[x]^k=\Sigma_{j=0}^{k-1} 2^j \cdot ([x_{j,1}]^k+[x_{j,2}]^k+[x_{j,3}]^k)+\Sigma_{j=0}^{k-1} 2^j \cdot [y_j]^k \qquad (18)$$

With the computation of the above expression (18), the processing (subroutine) related to bit recomposition ends. As is apparent from the description above, the share string of j bits (share string of bits) input to the subroutine related to bit recomposition is converted to the share (share of a ring) of the arithmetic operation for each bit. The converted share of the arithmetic operation indicates presence or absence of the bits in a bit string to be converted and is thus converted from a binary number to a decimal number by multiplying each bit by a corresponding exponent (2 to the power of j).

For example, when the share string of bits called b0101 is input to the subroutine of bit recomposition, the bit (0, 1) of each digit is converted to the numerical value (0, 1) by means of bit injection. The converted numerical value (0, 1) indicates presence or absence of the bit of each digit, and thus the binary number is converted to a decimal number of $2^3 \times 0 + 2^2 \times 1 + 2^1 \times 0 + 2^0 \times 1 = 5$.

In bit recomposition, k processes similar to those of bit injection described in the above operate in parallel. In other words, in bit recomposition, the carry computation information c, the carry C, the adjustment value y, and the like are computed in parallel for each bit of k-digit bits. Thus, k processes related to bit injection operate in parallel.

[Pop Count]

Next, a case in which the secret computation server 20 and the auxiliary server 30 execute pop count will be described. The secret computation server 20 and the auxiliary server 30 execute a plurality of bit injections in parallel, and thereby execute (implement) pop count of counting the number of is when the numerical value is expressed in a binary number.

Note that basic operation (flow, order of processing) of the secret computation system at the time of executing pop count is the same as that at the time of executing bit injection and bit recomposition, and thus description corresponding to FIG. 7 is omitted. In the following, differences between bit recomposition and pop count will mainly be described.

The processing of pop count and the processing of bit recomposition may be the same until computing the adjustment value y in expression (15).

The auxiliary server 30 computes the value (the sum of the adjustment values $y_j$ of each digit) expressed in the following expression (19) from the adjustment value $y_j$.

[Math. 19]

$$[\Sigma_{j=0}^{k-1} y_j]^k = \Sigma_{j=0}^{k-1} [y_j]^k \qquad (19)$$

The auxiliary server 30 distributes the value computed by the above expression (19) to each secret computation server 20.

The secret computation server 20 computes the share $[x]^k$ of the arithmetic operation by the following expression (20).

[Math. 20]

$$[x]^k = \Sigma_{j=0}^{k-1} ([x_{j,1}]^k + [x_{j,2}]^k + [x_{j,3}]^k + [y_j]^k) \qquad (20)$$

With the computation of the above expression (20), the processing (subroutine) related to pop count ends. Note that, in the computation of the above expression (20), the secret computation server 20 uses the value acquired from the auxiliary server 30 as the sum related to the adjustment value y similarly to bit recomposition.

Regarding pop count as well, similarly to bit recomposition, k processes similar to those of bit injection described in the above operate in parallel.

The share string of j bits (share string of bits) input to the subroutine related to pop count is converted to the share (share of a ring) of the arithmetic operation for each bit. If the share of the arithmetic operation of each bit is directly added, the number of "1"s constituting the bit string can be computed.

As described above, in the first example embodiment, the auxiliary server 30 is utilized so that the arithmetical exclusive OR required at the time of bit injection is not executed. Here, according to the left-hand side of expression (5), the arithmetical exclusive OR is obtained by multiplication related to the difference of the share. In k-digit bit recomposition, k bit injections are processed in parallel. Thus, parallel execution of the k bit injections is equivalent to execution of k arithmetical exclusive ORs in parallel. In one computation of the arithmetical exclusive OR, data of k bits needs to be transmitted and received between the secret computation servers 20, and thus in k executions of the arithmetical exclusive OR, a data amount of k×k bits is transmitted and received between the secret computation servers 20. Thus, in bit recomposition using the arithmetical exclusive OR, traffic of communication of O ($k^2$) (traffic of communication proportional to $k^2$) is required.

In contrast, in the disclosure of the present application using the auxiliary server 30, the carry computation information $c_j$ for each k digit transmitted from each secret computation server 20 is an information amount of 1 bit from expressions (7) and (13). In this case, when k-digit bit recomposition is performed, the information amount of k bits is transmitted from three secret computation servers 20 to the auxiliary server 30, and the traffic of communication is 3k bits. Thus, the traffic of communication along with transmission and reception of the carry computation information is O (k) (traffic of communication proportional to k). Regarding each digit, the adjustment value $y_j$ consisting of two elements (sub-shares) is transmitted to the three secret computation servers 20 from the auxiliary server 30, and thus in k-digit bit recomposition, a data amount of 2×3×k=6k bits is transmitted and received. Thus, in bit recomposition using the carry in which a plurality of bit injections are processed in parallel, the traffic of communication of 3k+6k=9k bits is required, and the order of the traffic of communication is O (k).

Regardless of whether the arithmetical exclusive OR is used or the carry is used, a necessary number of times of communication is two times, and there are not advantages of the disclosure of the present application in terms of the number of times of communication, but improvement is made in terms of the traffic of communication. In particular, when parallelism is higher (when k is larger), reduction of the traffic of communication is more remarkable. This is because, in bit recomposition using the arithmetical exclusive OR, the traffic of communication of O ($k^2$) is required, whereas in the method of the disclosure of the present application using the carry, the traffic of communication of O (k) is required. In other words, by using the carry, processing in which bit injection such as bit recomposition is executed in parallel can be efficiently executed.

Figure 8:
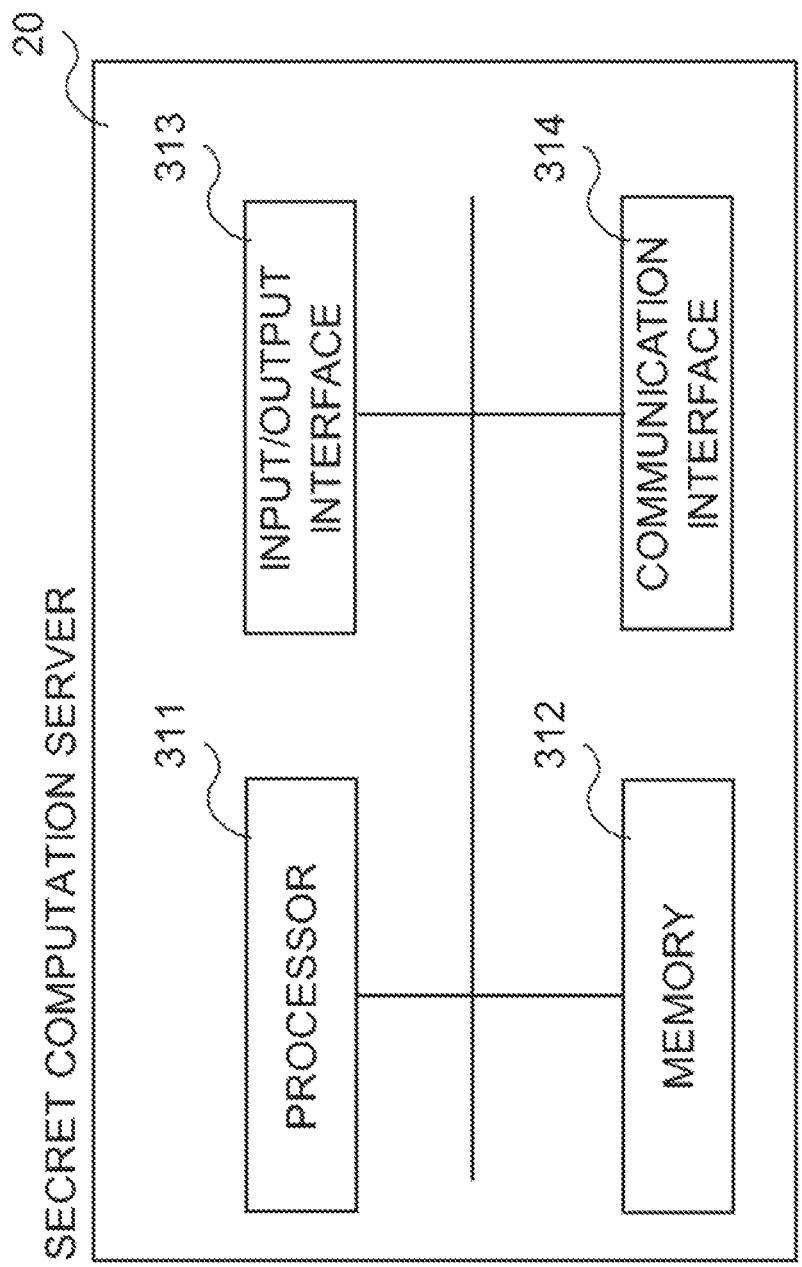
FIG. 8 is a diagram illustrating an example of a hardware configuration of the secret computation server.

Next, hardware of each apparatus constituting the secret computation system will be described. FIG. 8 is a diagram illustrating an example of a hardware configuration of the secret computation server 20.

The secret computation server 20 can be configured with an information processing apparatus (so-called, a computer), and includes a configuration illustrated in FIG. 8. For example, the secret computation server 20 includes a processor 311, a memory 312, an input/output interface 313, a communication interface 314, and the like. Constituent elements such as the processor 311 are connected to each other with an internal bus or the like, and are configured to be capable of communicating with each other.

Note that the configuration illustrated in FIG. 8 is not to limit the hardware configuration of the secret computation server 20. The secret computation server 20 may include hardware not illustrated, or need not include the input/output interface 313 as necessary. The number of processors 311 and the like included in the secret computation server 20 is not to be limited to the example illustrated in FIG. 8, and for example, a plurality of processors 311 may be included in the secret computation server 20.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (MC) or the like.

The function of the secret computation server 20 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the control server 10 and the auxiliary server 30 can also be configured with an information processing apparatus similarly to the secret computation server 20, and a basic hardware configuration thereof is not different from that of the secret computation server 20, and thus description thereof will be omitted.

[Example Alterations]

Note that the configuration, the operation, and the like of the secret computation system described in the example embodiment are merely examples, and are not to limit the configuration and the like of the system. For example, secret computation may be performed by four or more secret computation servers 20. Note that, in this case, it is only necessary that the adjustment value computed from the carry be changed as appropriate.

In the example embodiment, bit injection and the like using the auxiliary server 30 is described with the assumption of a secret computation method by a third party disclosed in NPL 1. With the assumption of the secret computation method, the carry C is computed by expression (8); however, when a method different from the secret computation method disclosed in NPL 1 described above is used, the carry C is computed by a computation method different from expression (8). In other words, the computation method of the carry C expressed in expression (8) is an example, and is not to limit computation of the carry C.

In the example embodiment, under the assumption that the auxiliary server 30 is a "semi-honest attacker", the carry computation information c is computed by using the correlated randomness β so that the contents of the share are not known to the attacker. However, when the auxiliary server 30 is an "entity that can be genuinely trusted", concealment of the share using the correlated randomness β is unnecessary. In other words, in the disclosure of the present application, each secret computation server 20 may transmit multiplication results of the element (sub-share) stored in each secret computation server 20 itself to the auxiliary server 30 as the carry computation information c.

In the sequence diagram used in the description above, a plurality of processes (processing) are described in order; however, the order of execution of the processes executed in each example embodiment is not limited to the described order. In each example embodiment, the illustrated order of processes can be changed as far as there is no problem with regard to processing contents, such as a change in which respective processes are executed in parallel, for example.

By installing a secret computation program in a storage section of the information processing apparatus (computer), the computer can be caused to function as the secret computation server. By causing the computer to execute the secret computation program, the secret computation method can be executed by the computer.

A part or all of the example embodiment described above may also be described, but not limited to, as in the following supplementary notes.

(Supplementary Note 1)

A secret computation system comprising:
three or more secret computation servers (20, 101); and
an auxiliary server (20, 102) connected to the three or more secret computation servers (20, 101), wherein
each of the three or more secret computation servers (20, 101) is configured to transmit, to the auxiliary server (20, 102), carry computation information for computing a carry indicating whether or not digit carry occurs when a share of arithmetic operation is added as a binary number,
the auxiliary server (20, 102) is configured to compute the carry based on the carry computation information received and compute an adjustment value used for computing the share of the arithmetic operation from a share of logical operation by using the computed carry, and distribute the computed adjustment value to the three or more secret computation servers (20, 101), and
each of the three or more secret computation servers (20, 101) is configured to convert the share of the logical operation to the share of the arithmetic operation by using a distributed value of the adjustment value.

(Supplementary Note 2)

The secret computation system according to supplementary note 1, wherein the three or more secret computation servers (20, 101) are configured to execute bit injection related to a predetermined value by using the distributed value of the adjustment value.

(Supplementary Note 3)

The secret computation system according to supplementary note 2, wherein the three or more secret computation servers (20, 101) and the auxiliary server (20, 102) are configured to execute a plurality of bit injections in parallel using the carry computation information, the carry, and the adjustment value.

(Supplementary Note 4)

The secret computation system according to supplementary note 3, wherein the three or more secret computation servers (20, 101) and the auxiliary server (20, 102) are configured to execute bit recomposition of converting a share for logical operation to a share for arithmetic operation by executing the plurality of bit injections in parallel.

(Supplementary Note 5)

The secret computation system according to supplementary note 4, wherein the auxiliary server (20, 102) is configured to compute the adjustment value for each bit of k-digit bits, and distribute a sum of values obtained by multiplying the adjustment value of each digit by 2 to the power of j to the three or more secret computation servers (20, 101).

(Supplementary Note 6)

The secret computation system according to supplementary note 3, wherein the three or more secret computation servers (20, 101) and the auxiliary server (20, 102) are configured to execute pop count of counting number of is when a numerical value is expressed in a binary number by executing the plurality of bit injections in parallel.

(Supplementary Note 7)

The secret computation system according to supplementary note 6, wherein the auxiliary server (20, 102) is configured to compute the adjustment value for each bit of k-digit bits, and distribute a sum of the adjustment value of each digit to the three or more secret computation servers (20, 101).

(Supplementary Note 8)

The secret computation system according to any one of supplementary notes 1 to 7, wherein the three or more secret computation servers (20, 101) are configured to conceal the share of the logical operation stored by the three or more secret computation servers (20, 101) by using correlated randomness, and generate the carry computation information.

(Supplementary Note 9)

The secret computation system according to any one of supplementary notes 1 to 8, wherein when the share of the logical operation is x1, x2, and x3, the auxiliary server (20, 102) is configured to compute the carry C by using C=x1·x2 EXOR x2·x3 EXOR x3·x1 (indicates multiplication operation, and EXOR indicates exclusive OR).

(Supplementary Note 10)

The secret computation system according to supplementary note 9, wherein the auxiliary server (20, 102) is configured to set the adjustment value to 0 when a value of the carry is 0, and set the adjustment value to −2 when the value of the carry is 1.

(Supplementary Note 11)

A secret computation server (20, 101) configured to be connected to an auxiliary server (20, 102), wherein the secret computation server (20, 101) is configured to transmit, to the auxiliary server (20, 102), carry computation information for computing a carry indicating whether or not digit carry occurs when a share of arithmetic operation is added as a binary number, acquire, from the auxiliary server (20, 102), a distributed value of an adjustment value used for computing a share of arithmetic operation from the share of the logical operation by using the carry, and convert the share of the logical operation to the share of the arithmetic operation by using the distributed value of the adjustment value.

(Supplementary Note 12)

An auxiliary server (20, 102) configured to be connected to three or more secret computation servers (20, 101), wherein the auxiliary server (20, 102) is configured to receive carry computation information for computing a carry indicating whether or not digit carry occurs when a share of arithmetic operation is added as a binary number, the carry computation information being transmitted by each of the three or more secret computation servers (20, 101), and compute the carry based on the received carry computation information and compute an adjustment value used for computing a share of arithmetic operation from the share of the logical operation by using the computed carry, and distribute the computed adjustment value to the three or more secret computation servers (20, 101).

(Supplementary Note 13)

A secret computation method in a secret computation system including three or more secret computation servers (20, 101) and an auxiliary server (20, 102) connected to the three or more secret computation servers (20, 101), the secret computation method comprising:

transmitting, by each of the three or more secret computation servers (20, 101), to the auxiliary server (20, 102), carry computation information for computing a carry indicating whether or not digit carry occurs when a share of arithmetic operation is added as a binary number;

computing, by the auxiliary server (20, 102), the carry based on the carry computation information received and compute an adjustment value used for computing the share of the arithmetic operation from a share of logical operation by using the computed carry, and distribute the computed adjustment value to the three or more secret computation servers (20, 101); and converting, by each of the three or more secret computation servers (20, 101), the share of the logical operation to the share of the arithmetic operation by using a distributed value of the adjustment value.

(Supplementary Note 14)

A program for causing a computer (311) to execute:

processing of transmitting, to the auxiliary server (20, 102), carry computation information for computing a carry indicating whether or not digit carry occurs when a share of arithmetic operation is added as a binary number;

processing of acquiring, from the auxiliary server (20, 102), a distributed value of an adjustment value used for computing a share of arithmetic operation from the share of the logical operation by using the carry; and processing of converting the share of the logical operation to the share of the arithmetic operation by using the distributed value of the adjustment value.

Note that the modes of supplementary notes 11 to 14 can be developed into the mode of supplementary note 2 to the mode of supplementary note 10 similarly to supplementary note 1.

Note that the disclosure of each of the cited literatures in Citation List described above is incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10 Control Server
20, 20-1 to 20-3, 101 Secret Computation Server 30, 102 Auxiliary Server
201, 301, 401 Communication Control Section
202 Distribution Data Generation Section
203 Distribution Data Decoding Section
302 Secret Computation Execution Section
311 Processor
312 Memory
313 Input/Output Interface
314 Communication Interface
402 Secret Computation Assist Section

What is claimed is:

1. A secret computation system comprising:
three or more secret computation servers; and
an auxiliary server connected to the three or more secret computation servers, wherein
each of the three or more secret computation servers includes a memory storing instructions and one or more processors configured to execute the instructions, and is configured to transmit, to the auxiliary server, carry computation information for computing a carry indicating whether or not digit carry occurs when a share of arithmetic operation is added as a binary number,
the auxiliary server includes a memory storing instructions and one or more processors configured to execute the instructions, and is configured to compute the carry based on the carry computation information received and compute an adjustment value used for computing the share of the arithmetic operation from a share of logical operation by using the computed carry, and distribute the computed adjustment value to the three or more secret computation servers, and
each of the three or more secret computation servers is configured to convert the share of the logical operation to the share of the arithmetic operation by using a distributed value of the adjustment value.

2. The secret computation system according to claim 1, wherein
the three or more secret computation servers are configured to execute bit injection related to a predetermined value by using the distributed value of the adjustment value.

3. The secret computation system according to claim 2, wherein
the three or more secret computation servers and the auxiliary server are configured to execute a plurality of bit injections in parallel using the carry computation information, the carry, and the adjustment value.

4. The secret computation system according to claim 3, wherein
the three or more secret computation servers and the auxiliary server are configured to execute bit recomposition of converting a share for logical operation to a share for arithmetic operation by executing the plurality of bit injections in parallel.

5. The secret computation system according to claim 4, wherein
the auxiliary server is configured to compute the adjustment value for each bit of k-digit bits, and distribute a sum of values obtained by multiplying the adjustment value of each digit by 2 to the power of j to the three or more secret computation servers.

6. The secret computation system according to claim 3, wherein
the three or more secret computation servers and the auxiliary server are configured to execute pop count of counting number of 1s when a numerical value is expressed in a binary number by executing the plurality of bit injections in parallel.

7. The secret computation system according to claim 6, wherein
the auxiliary server is configured to compute the adjustment value for each bit of k-digit bits, and distribute a sum of the adjustment value of each digit to the three or more secret computation servers.

8. The secret computation system according to claim 1, wherein
the three or more secret computation servers are configured to conceal the share of the logical operation stored by the three or more secret computation servers by using correlated randomness, and generate the carry computation information.

9. The secret computation system according to claim 1, wherein
when the share of the logical operation is $x_1$, $x_2$, and $x_3$, the auxiliary server is configured to compute the carry C by using $C = x_1 \cdot x_2$ EXOR $x_2 \cdot x_3$ EXOR $x_3 \cdot x_1$ ($\cdot$ indicates multiplication operation, and EXOR indicates exclusive OR).

10. The secret computation system according to claim 9, wherein the auxiliary server is configured to set the adjustment value to 0 when a value of the carry is 0, and set the adjustment value to −2 when the value of the carry is 1.

11. A secret computation server, configured to be connected to an auxiliary server, comprising:
a memory storing instructions; and
one or more processors configured to execute the instructions, wherein
the secret computation server is configured to
transmit, to the auxiliary server, carry computation information for computing a carry indicating whether or not digit carry occurs when a share of arithmetic operation is added as a binary number,
acquire, from the auxiliary server, a distributed value of an adjustment value used for computing a share of arithmetic operation from the share of the logical operation by using the carry, and
convert the share of the logical operation to the share of the arithmetic operation by using the distributed value of the adjustment value.

12. An auxiliary server, configured to be connected to three or more secret computation servers, comprising:
a memory storing instructions; and
one or more processors configured to execute the instructions, wherein
the auxiliary server is configured to
receive carry computation information for computing a carry indicating whether or not digit carry occurs when a share of arithmetic operation is added as a binary number, the carry computation information being transmitted by each of the three or more secret computation servers, and
compute the carry based on the received carry computation information and compute an adjustment value used for computing a share of arithmetic operation from the share of the logical operation by using the computed carry, and distribute the computed adjustment value to the three or more secret computation servers.

13. A secret computation method in a secret computation system including three or more secret computation servers and an auxiliary server connected to the three or more secret computation servers, the secret computation method comprising:

transmitting, by each of the three or more secret computation servers, to the auxiliary server, carry computation information for computing a carry indicating whether or not digit carry occurs when a share of arithmetic operation is added as a binary number;

computing, by the auxiliary server, the carry based on the carry computation information received and compute an adjustment value used for computing the share of the arithmetic operation from a share of logical operation by using the computed carry, and distribute the computed adjustment value to the three or more secret computation servers; and converting, by each of the three or more secret computation servers, the share of the logical operation to the share of the arithmetic operation by using a distributed value of the adjustment value.

* * * * *